United States Patent [19]

Milkes

[11] 4,059,728
[45] Nov. 22, 1977

[54] TOUCHPAD DIALER FOR MOBILE TELEPHONES

[75] Inventor: C. Paul Milkes, Encino, Calif.

[73] Assignee: American Communication Systems, Encino, Calif.

[21] Appl. No.: 691,427

[22] Filed: June 1, 1976

[51] Int. Cl.² ............................................. H04Q 7/04
[52] U.S. Cl. ...................................... 179/2 E; 325/55; 325/64
[58] Field of Search ................. 179/41 A, 2 E, 90 K, 179/90 B; 325/55, 64, 16; 343/175, 176

[56] References Cited

U.S. PATENT DOCUMENTS

| 3,193,623 | 7/1965 | Burns et al. ...................... 179/41 A |
| 3,644,681 | 2/1972 | Rice ................................... 179/41 A |
| 3,856,982 | 12/1974 | Lawson et al. ..................... 179/90 K |
| 3,860,765 | 1/1975 | McCabe et al. ..................... 179/90 B |
| 3,920,926 | 11/1975 | Lenaerts et al. .................... 179/90 B |
| 3,982,079 | 9/1976 | Hoehn et al. ....................... 179/90 K |

Primary Examiner—Kathleen H. Claffy
Assistant Examiner—Gerald L. Brigance
Attorney, Agent, or Firm—Spensley, Horn & Lubitz

[57] ABSTRACT

A touchpad dialer for mobile telephones comprising a touchpad keyboard, a dial pulse relay, a means for converting signals from the keyboard to control signals for the dial pulse relay, a tone start, and a means for actuating the tone start relay before the dial pulse relay is actuated for a predetermined time after the control signals to the dial pulse relay cease. Both the dial pulse relay and the tone start relay are electrically coupled to the control head of a mobile telephone.

11 Claims, 3 Drawing Figures

TOUCHPAD DIALER FOR MOBILE TELEPHONES

FIELD OF INVENTION

This invention relates to touchpad dialers and more particularly to touchpad dialers for mobil telephones.

DESCRIPTION OF THE PRIOR ART

With the advent of mobil telephones being installed in vehicles, it is necessary to provide some method to communicate the desired telephone number to the telephone exchange. The first method for doing this was similar to a switchboard in that picking up the receiver would put one into touch with the operator to whom one would tell the telephone number orally to and who would then dial it for you. This system is disadvantageous because of the time involved in putting through the call and because the switchboard operator can only handle a limited number of calls at any one time.

Accordingly, automatic equipment was developed wherein one could dial using a rotary dial mounted in the vehicle with the mobil telephone. This system was faster than the switchboard type system but still had several disadvantages. First of all, relative to the speeds at which vehicles travel, rotary dial systems require a long time to dial the telephone number thereby creating a driving hazard. Second of all, since one is required to put his finger in the right hole and then rotate the dial all the way to the stop and let it go back, the likelihood of an error resulting in a wrong telephone number is high. Thirdly, no matter how proficient the operator becomes at utilizing the rotary dial, the operator must always look at the dial to prevent dialing errors.

Accordingly, it is a general object of the present invention to provide a dialer system which requires a relatively short period of time to dial the number.

It is another object of the present invention to provide a dialer system which substantially reduces the number of wrong numbers dialed.

It is yet another object of the present invention to provide a dialer which the operator does not have to look at during dialing.

It is still another object of the present invention to provide a dialer which is compatible with existing central telephone equipment.

SUMMARY OF THE INVENTION

In keeping with the principals of the present invention, the objects are accomplished by the unique combination of a touchpad keyboard, a dial pulse relay, a means for converting signals from the keyboard to control signals for actuating the dial pulse relay, a tone start relay, and a means for actuating the tone start relay before the dial pulse relay is actuated, and for keeping the tone start relay actuated for a pedetermined time after the control signals to the dial pulse relay cease. Both the dial pulse relay and the tone start relay are electrically coupled to and control the control head of the mobil telephone installed in the vehicle. In operation when a button on the touchpad keyboard is depressed, the output is converted to signals for actuating the dial pulse relay and some predetermined time before the dial pulse relay is activated, the tone start relay will be activated to begin the tone in the control head which will be interrupted by the dial pulse relay. After dialing is completed, the tone start relay continues to be actuated for some predetermined time to allow the next digit of the phone number to be dialed.

In a second embodiment a memory is provided for storing telephone numbers which have previously been dialed. In all cases, telephone numbers stored in the memory can be immediately recalled and dialed by simply hitting no more than two buttons on the touchpad keyboard.

BRIEF DESCRIPTION OF THE DRAWINGS

The above mentioned and other features and objects of the present invention will become more apparent by reference to the following description taken in conjuction with the accompanying drawings wherein like reference numerals denote like elements and in which.

DESCRIPTION OF THE PREFERRED EMBODIMENT

Figure 1:
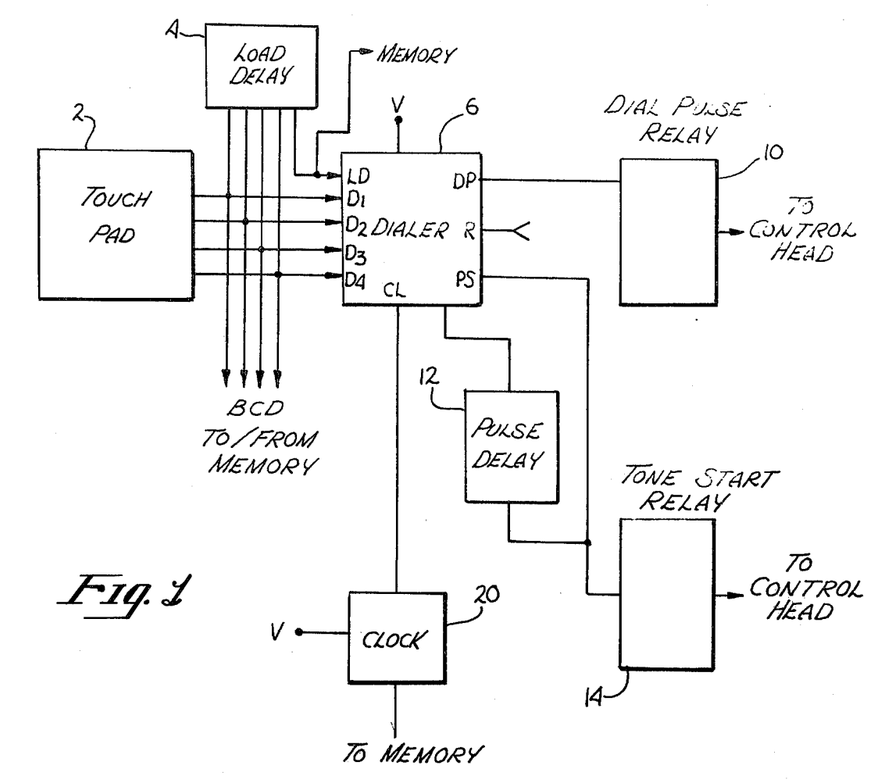
FIG. 1 is a block diagram of a touchpad dialer for a mobil telephone in accordance with the teachings of the present invention.

Referring to FIG. 1, shown therein is a touchpad dialer for mobile telephones. The touchpad dialer comprises a touchpad keyboard 2. The touchpad keyboard comprises a plurality of momentary contract switches connected in parallel and coupled to a source of voltage. The output of the touchpad keyboard is a binary coded decimal (BCD) representation of the number corresponding to the key depressed. The BCD output of touchpad keyboard 2 is coupled to the D1 - D4 inputs of dialer circuit 6. The BCD outputs of keyboard 2 are also coupled to the input of load delay circuit 4. The output of load delay circuit 4 is coupled to the load input dialer 6. The dial pulse output of dialer 6 is coupled to dial pulse relay/driver 10. Dial pulse relay/driver 10 is connected to the control head of the mobile telephone.

The tone start output of dialer 6 is coupled to the input of pulsing delay circuit 12 and the output of pulsing delay circuit 12 is coupled to the memory read inhibit input of dialer 6. The tone start output of dialer 6 is also coupled to tone start relay/driver 14 and tone start relay/driver 14 is electrically coupled to the control head of the mobil telephone. The clock signal output of clock 20 is coupled to the clock input of dialer 6.

In operation, when a button on touchpad keyboard 2 is depressed, a BCD representation of the number corresponding to the button depressed is applied to the output lines of touchpad keyboard 2. The BCD output signal is applied to the D1 - D4 inputs of dialer 6. Load delay 4 also receives the BCD output signals and generates a signal which prevents dialer 6 from storing the BCD signals for a short period of time thereby preventing any spurious signals from being stored in dialer 6. Dialer 6 then stores the BCD representation and converts it to a plurality of dialing pulses of the same number as the number originally depressed on the touchpad keyboard.

At the same time that the BCD representation of the number is received by dialer 6, a tone start output signal is applied to the input of tone start relay/driver 14 and pulsing delay circuit 12. Upon receipt of the tone start output signal from dialer 6, pulsing delay circuit 12 generates an output of some predetermined length to the memory read inhibit input of dialer 6 thereby preventing the dial pulses from being transmitted from dialer 6 to dial pulse relay/driver 10 for some predetermined length of time. When the tone start output is applied to the tone start relay/driver circuit 14, tone start relay/driver 14 causes the control head to generate a tone. Since the pulsing delay circuit 12 is peventing the dial pulse from being transmitted to the dial pulse relay and driver, this insures that the tone will be turned on in the control head before the dialing pulses are applied. After the output signal from the pulsing delay circuit 12 ceases, the dial pulse signals are applied to the dial pulse relay/driver circuit 12. Applying dial pulse signal to dial pulse relay/driver 12 causes the dial pulse relay/driver 12 to interrupt the tone in the control head of the mobil telephone. In this way the dial pulses are transmitted to the central station as interruptions of the tone. After the dial pulses applied to dial pulse relay/driver 12 cease, tone start relay/driver circuit 14 remains actuated for some predetermined time thereafter. In this way the tone start relay/driver 14 will remain actuated until the next series of dial pulses are generated by dialer 5 in response to the depression of another button on the touchpad keyboard 2.

Figure 2:
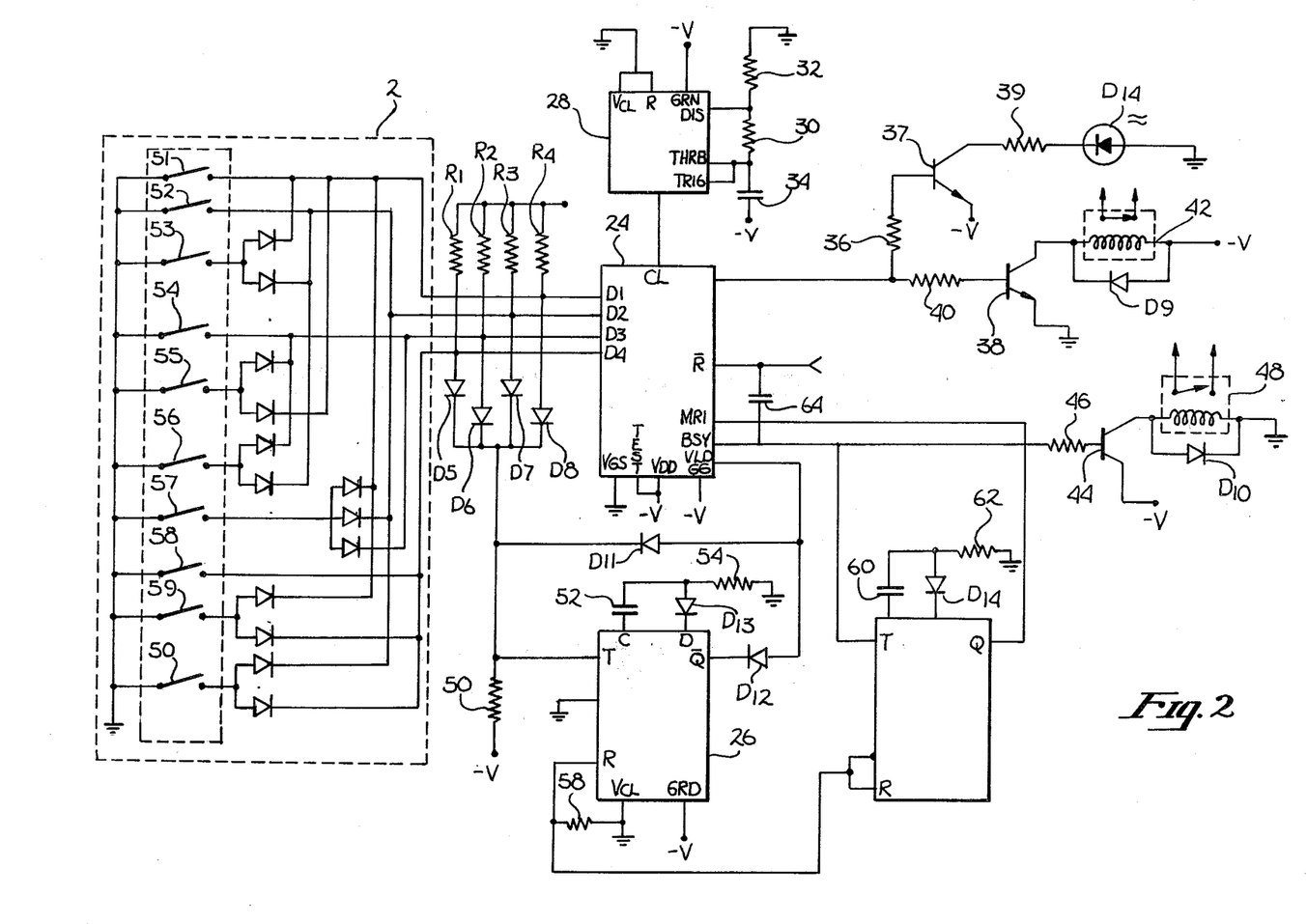
FIG. 2 is a circuit diagram of a touchpad dialer for a mobil telephone of FIG. 1.

Referring to FIG. 2, shown therein is a circuit diagram of the touchpad dialer of FIG. 1. The touchpad dialer of FIG. 2 includes a touchpad keyboard which comprises a plurality of momentary contact switches S1 – S0 all of which have one terminal coupled to ground. The other terminal of switches S1 – S0 is coupled to a diode matrix as shown. The diode matrix is well known in the art and performs the function of generating a BCD representation of the number of the button depressed on the outputs of the touchpad keyboard 2. The outputs of touchpad keyboard 2 are connected to the D1 – D4 inputs of dialer chip 24. Furthermore, each of the outputs of keyboard 2 are coupled respectively to one end of resistors R1, R2, R3 and R4. The other end are resistors R1 – R4 are coupled together and connected to a source of negative voltage represented by $-V$. Also, each of the outputs of keyboard 2 is coupled respectively to the anode end of diodes $D_5 - D_8$. The cathode ends of diodes $D_5 - D_8$ are all coupled together and connected to the T input of one shot 26.

The clock input of dialer chip 24 is connected to the output of clock chip 28. Both the $V_{cl}$ and reset terminals of clock chip 28 are grounded. The ground terminal of clock chip 28 is connected to a source of negative voltage represented by the $-V$. Resistor 30 is connected between the discharge and threshhold terminals of clock chip 28. Furthermore, the discharge terminal of clock 28 is connected to ground via resistor 32 and the threshhold terminal and trigger terminal of clock chip 28 are coupled together. In addition, capacitor 34 is connected between a threshhold terminal of clock chip 28 and a source of negative voltage represented by $-V$.

The dial pulse output of dialer chip 24 is connected to the base of transistor 38 via resistor 40. The emitter of transistor 38 is grounded and the collector is connected to a source of negative voltage via the coil of dial pulse relay 42. Diode $D_9$ is connected across the coil of relay 42. The $V_{GS}$ terminal of dialer chip 24 is coupled to ground and the test, $V_{DO}$ and $V_{GG}$ terminals of dialer chip 24 are connected to a source of negative voltage. The busy terminal of dialer chip 24 is connected to the base of transistor 44 via a resistor 46. The emitter of transistor 44 is connected to a source of negative voltage and the collector of transistor 44 is connected to ground via the coil of tone start relay 48. Diode $D_{10}$ is connected across the coil of tone start relay 48.

Resistor 36 is coupled between the DP out terminal of dialer chip 24 and the base of transistor 37. The emitter of transistor 37 is coupled to a source of negative voltage $-V$. The collector of transistor 37 is coupled to the cathode of a light emitting diode (LED) $D_{14}$ via resistor 39. The anode of LED $D_{14}$ is coupled to ground.

The load input of dialer chip 24 is coupled to the key input of one shot chip 26 via diode $D_{11}$ and to the Q output of one shot chip 26 via diode $D_{12}$. The T input of one shot chip 26 is connected to a source of negative voltage via resistor 50. One terminal of capacitor 52 and the cathode terminal of diode $D_{13}$ are coupled respectively to the C and D terminals of one shot chip 26. Resistor 54 is coupled respectively between the terminal formed by the other terminal of capacitor 52 and the anode terminal of diode 13 and ground. The ground terminal of one shot chip 26 is connected to a source of negative voltage.

The memory read inhibit terminal of dialer chip 24 is connected to the Q output of one shot chip 56. The T input of one shot chip 56 is connected to the busy output terminal of dialer chip 24. The R terminal of one shot chip 56 is connected to ground via resistor 58. Furthermore, the R terminals of one shot chips 26 and 56 are coupled together. One terminal of capacitor 60 and the anode terminal of diode $D_{14}$ are coupled respectively to the C and D terminals of one shot chip 56. Resistor 62 is coupled respectively between the junction formed by the other terminal of capacitor 60 and the anode terminal of diode $D_{14}$ and ground. The $V_{CL}$ terminal of one shot chip 56 is coupled to ground and a capacitor 64 is coupled between the busy terminal and the R bar terminal of dialer chip 24. The R bar terminal of dialer chip 24 is coupled to one terminal of external reset switch 66 and the other terminal of external reset switch 66 is coupled to a source of negative voltage represented by $-V$.

In practice, dialer chip 24 may be a Collins radio CRC 8000. Furthermore, clock chip 28 can be a National Semiconductor NE 555 and one shots 26 and 56 can be each one half of National Semiconductor 9602. Furthermore, a BCD diode matrix converter need not be incorporated into touchpad keyboard 2 and could be located externally. In addition, touchpad keyboard 2 could also be made such that the required BCD signal is generated by stacks of mechanical switches coupled to the touchpad buttons. Furthermore, the buttons of keyboard 2 could correspond to other symbols besides numbers. The buttons could correspond to any alphanumeric symbol such as numbers, letters, punctuation, the number symbol, etc.. Also, the keyboard can be provided with an indexing protuberance which the operator can feel with his fingers to properly position the operators hand on the keyboard thereby allowing the operator to easily dial without diverting his eyes from his driving.

In operation when one of the keys $S_1 - S_0$ is depressed a BCD representation of the number corresponding to that key appears on the output lines of touchpad keyboard 2. The BCD representation is applied to the $D_1 - D_4$ inputs of dialer chip 24 and at the same time passes through diodes $D_5 - D_8$ to the T input of one shot 26. The signal applied to the T input of one shot 26 causes an output at the Q output of one shot 26. The output signal from the Q terminal of one shot 26 is applied to the load terminal of dialer chip 24. The presence of the signal at the load terminal of dialer chip 24 prevents the signal appearing at the $D_1 - D_4$ inputs from being loaded into the memory portion of dialer chip 24. The time constant of one shot 26 is very short, typically in the order of 30 milliseconds, and prevents spurous signals from being loaded into dialer chip 24. As soon as one shot 26 returns to its original stable state, the signal at the keyboard terminal of dialer chip 26 is removed thereby allowing the BCD representation appearing at the $D_1 - D_4$ inputs to be loaded into dialer 24.

As soon as the BCD representation is loaded into dialer chip 24, a signal is generated at the busy terminal of dialer chip 24 which is coupled to the base of transistor 24 and the T input of one shot 56. The busy signal applied to the base of transistor 44 causes transistor 44 to turn on thereby actuating tone start relay 48 thereby causing the contacts of tone start relay 48 to close. Since the contacts of tone start relay 48 are coupled to the control head of the mobil telephone, closure of the tone start relay contacts causes a tone to be produced in the control head. The output signal from the busy terminal a dialer chip 24 which is applied to the T input of one shot 56 causes a signal to appear at the Q terminal of one shot 56 which is applied to the memory read inhibit terminal of dialer chip 24. The signal applied to the memory read inhibit terminal prevents the BCD representation which is stored in the memory portion of dialer chip 24 from being read out of the memory and converted into a dial pulse signal at the dial pulse out terminal of dialer chip 24. The time constant of one shot 56 is short, typically on the order of 1 second, and allows the control head to generate the tone some short period of time before the dial pulse signal is applied.

As soon as the signal is removed from the memory read inhibit of dial chip 24, the BCD representation of the number corresponding to the button originally depressed on the touchpad keyboard 2 is converted into dial pulses which are applied to the base of transistor 38. The dial pulses cause transistor 38 to turn off and on thereby causing dial pulse relay 42 to be intermittently actuated. When dial pulse relay 42 is intermittently actuated, the normally closed contacts of dial pulse relay 42 open and close thereby interrupting the tone generated by the control head. In this way the dial pulses are transmitted to the mobil telephone central office equipment. After the last dial pulse is transmitted, tone start relay 48 is continued to be actuated form some predetermined time, typically on the order of 3 seconds, thereby allowing the next number to be transmitted without repeating the complete sequence. When the dial pulses are applied to the base of transmitter 38, it is also applied to the base of transistor 37. The dial pulses also cause transistor 37 to turn on thereby turning on LED $D_{14}$ and indicating to the operator that the touchpad dialer is operating.

Clock chip 28 together with resistors 30 and 32 and capacitor 34 form a clock and provide proper timing of the data as it passes through and is processed in dialer chip 24. External reset switch 66 is connected to the telephone instrument such that when the receiver is on-hook the switch is closed. When the receiver is on hook the external reset switch applies a signal to the R terminal of dialer chip 24 and resets the dialer chip. Therefore, before the first number of the desired telephone number is entered via the touchpad keyboard 2, the receiver must be placed in the off-hook condition. Furthermore, reset of dialer chip 24 occurs when the interval between the numbers is too great and tone start relay 48 is allowed to deactivate. This second reset signal is transmitted by capacitor 64 connected between the R bar terminal and the busy terminal of dialer chip 24.

In practice, the reset function can be implemented in any manner compatible with the equipment utilized and the particular implementation is not essential to the invention.

Figure 3:
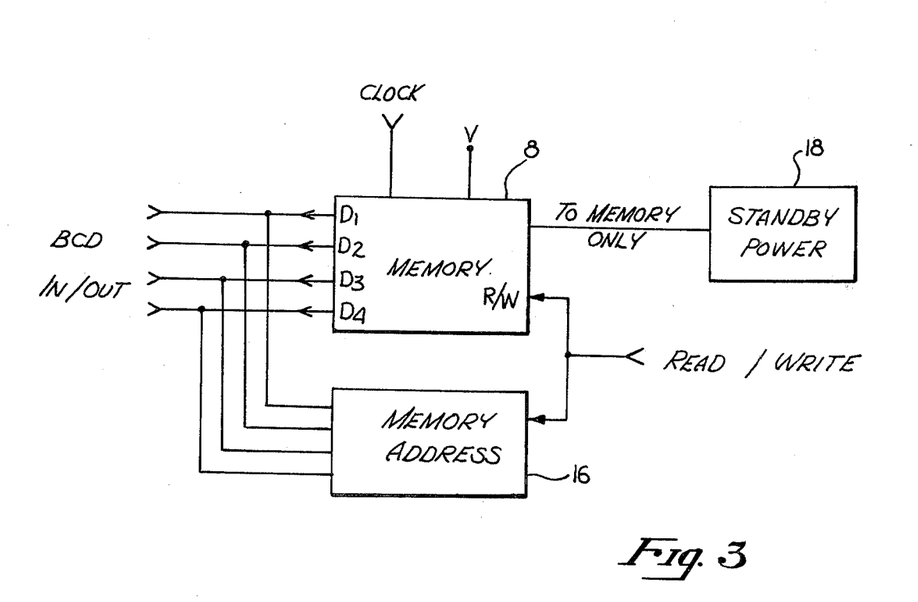
FIG. 3 is a block diagram of a memory option for the touchpad dialer to FIG. 1.

Referring to FIG. 3, shown therein is a memory circuit to be utilized in accordance with the touchpad dialer system of FIG. 1. The memory circuit of FIG. 3 includes a memory 8. The BCD output from touchpad keyboard 2 is applied to the $D_1 - D_4$ inputs/outputs of memory 8. Furthermore, the BCD signal is applied to the memory address circuit 16. The output of load delay circuit 4 is also applied to memory 8 and memory address 16. Furthermore, the clock 20 is also coupled to the clock input of memory 8. Furthermore, memory 8 is normally powered by the electrical system of the vehicle in which the mobil telephone is installed. During those situations when the power is turned off in the vehicle, memory 8 is provided with a source of standby power 18.

In practice, memory 8 is typically a read/write memory wherein data can be written into the memory and read out of the memory on command.

In operation, at the same time the BCD representation of the number corresponding to the button of the touchpad keyboard 2 which is depressed is applied to dialer 6, it is also applied to the inputs of memory 8 and memory address 16. Furthermore, the load signal from load delay circuit 4 is also applied to memory and memory address 16. Accordingly, as the BCD representation of the numbers of the telephone number are applied to dialer 6 they are applied to memory wherein they are stored and to memory address 16 wherein they are addressed into memory 8. Therefore, if the telephone number is busy, the last telephone number entered can be recalled from memory 8 by depressing two of the buttons on touchpad keyboard 2 which correspond to the address for the last telephone number entered. In this way, the last telephone number entered can be called again by depressing only two buttons on the touchpad keyboard 2 thereby greatly reducing the required time to call the number again.

In addition to storing the last telephone number entered on the touchpad keyboard 2, other frequently called telephone numbers may be stored in memory 8. To store a telephone number in memory 8, one or two buttons which correspond to the address of a particular location in the memory are depressed and then to appropriate buttons of touchpad keyboard 2 corresponding to the digits of the telephone number are depressed. To recall telephone numbers previously stored in the memory, one need only to depress the buttons of touchpad keyboard 2 which correspond to the address of the desired telephone number in memory 8. Therefore, frequently used telephone numbers can be called easily and with a great reduction in the time required to "dial" the number.

Since memory 8 may store numbers for long periods of time, standby power is provided so that when the mobil telephone is off and the vehicle power is off. Power is still applied to the memory thereby preventing erasure of its contents.

In all cases it is understood that the above described embodiment is merely illustrative of but one of the many possible specific embodiments which can represent applications of the principals of the present invention. Numerous and varied other arrangements can be readily devised in accordance with these principals by those skilled in the art without departing from the spirit and scope of the invention.

I claim:

1. A touchpad dialer for mobil telephones having a control head and wherein dial pulses are transmitted to a central office as interruptions in a tone comprising:
   a touchpad keyboard means having a plurality of keyboard buttons, each of said buttons being assigned one alpha-numeric symbol, said keyboard means generating an output signal when one of said buttons is depressed, said output signal being an electrical representation of the alpha-numeric symbol assigned to said button;
   a dial pulse control means coupled to said control head of said mobil telephone for interrupting said tone in response to a control signal;
   a means for converting said output signals from said keyboard to said control signals for said dial pulse control means;
   a tone start control means coupled to said control head of said mobil telephone for turning on said tone; and
   a means coupled to said converting means for actuating said tone start control means some predetermined time before said control signals are transmitted to said dial pulse control means and for keeping said tone pulse control means actuated for some predetermined time after said control signals to said dial pulse control means cease.

2. A touchpad dialer according to claim 1 wherein said electrical representation of said alpha-numeric symbol is binary coded decimal.

3. A touchpad dialer according to claim 2 wherein said means for converting said output signals comprises a dialer integrated circuit.

4. A touchpad dialer according to claim 1 wherein said dial pulse control means comprises a relay.

5. A touchpad dialer according to claim 4 wherein said tone start control means comprises a relay.

6. A touchpad dialer according to claim 2 wherein means for actuating said tone start control means comprises a pulsing delay circuit.

7. A touchpad dialer according to claim 6 wherein said pulsing delay circuit comprises a one shot circuit.

8. A touchpad dialer according to claim 1 further comprisng a means for preventing said converting means from accepting said output signals from said keyboard means for some predetermined time thereby preventing undesirable signals from being acted upon by said converting means and resulting in an erroneous control signal for said dial pulse control means.

9. A touchpad dialer according to claim 1 further comprising a memory means coupled to said keyboard means and said converter means for storing said output signals from said keyboard means at particular addresses in said memory means and for supplying said stored output signals to said converter means when at least one of said buttons of said keyboard corresponding to one of said particular addresses is depressed.

10. A touchpad dialer according to claim 9 wherein said memory means further comprises a source of standby power.

11. A touchpad dialer according to claim 9 wherein said memory means comprises a read/write memory and a means for addressing said output signals into said read/write memory.

* * * * *

UNITED STATES PATENT OFFICE
CERTIFICATE OF CORRECTION

Patent No. 4,059,728　　　　　　　　Dated November 22, 1977

Inventor(s) C. Paul Milkes　　　　　　　　Page 1 of 4

It is certified that error appears in the above-identified patent and that said Letters Patent are hereby corrected as shown below:

At Column 1, lines 7, 10, 23, 61, please delete "mobil" and insert --mobile--.

At Column 2, lines 17, 20, 48, please delete "mobil" and insert --mobile--.

At Column 5, line 45, please delete "mobil" and insert --mobile--.

At Column 6, lines 20, 63, please delete "mobil" and insert --mobile--.

At Column 7, line 7, please delete "mobil" and insert --mobile--.

At Column 1, line 50, please delete "principals" and insert --principles--.

UNITED STATES PATENT OFFICE
CERTIFICATE OF CORRECTION

PATENT NO. : 4,059,728
DATED : November 22, 1977
INVENTOR(S) : C. Paul Milkes

It is certified that error appears in the above-identified patent and that said Letters Patent are hereby corrected as shown below:

At Column 2, line 29, please delete "contract" and insert --contact--.

At Column 3, lines 13, 14, 15, and 19, please delete "12" and insert --10--.

At Column 3, lines 28-29, and 30, please delete "S1-S0" and insert --50-59--.

At Column 4, line 9, please delete "key" and insert --T--.

At Column 4, line 59, please delete "S1-S0" and insert --50-59--

At Column 5, line 14, please delete "24 and the T" and insert --44 and the T--.

At Column 5, line 8, please delete "keyboard" and insert --load--

At Column 5, line 8, please delete "dialer chip 26" and insert --dialer chip 24--.

At Column 5, line 47, please delete "is continued to be actuated form" and insert --continues to be actuated for--.

At Column 5, line 51, please delete "transmitter" and insert --transistor--.

At Column 6, lines 51-52, please delete "to appropriate" and insert --the appropriate--.

UNITED STATES PATENT OFFICE
CERTIFICATE OF CORRECTION

Page 3 of 4

PATENT NO. : 4,059,728
DATED : November 22, 1977
INVENTOR(S) : C. Paul Milkes

It is certified that error appears in the above-identified patent and that said Letters Patent are hereby corrected as shown below:

IN THE DRAWINGS:

Please amend Figure 2 as described and shown in the accompanying drawing.

Signed and Sealed this

Twenty-third Day of May 1978

[SEAL]

Attest:

RUTH C. MASON
Attesting Officer

LUTRELLE F. PARKER
Acting Commissioner of Patents and Trademarks

Fig. 2